(12) United States Patent
Lutsen et al.

(10) Patent No.: US 7,649,048 B2
(45) Date of Patent: Jan. 19, 2010

(54) CONJUGATED POLYMERS PROVIDED WITH AT LEAST ONE MOLECULAR IMPRINTED POLYMER AND A METHOD FOR THEIR PREPARATION VIA CONJUGATED MACRO-INIFERTERS

(75) Inventors: Laurence Lutsen, Coudekerque-Branche (FR); Dirk Vanderzande, Hasselt (BE)

(73) Assignees: IMEC, Leuven (BE); Universiteit Hasselt, Diepenbeek (BE)

( * ) Notice: Subject to any disclaimer, the term of this patent is extended or adjusted under 35 U.S.C. 154(b) by 513 days.

(21) Appl. No.: 11/247,397

(22) Filed: Oct. 11, 2005

(65) Prior Publication Data

US 2006/0079648 A1    Apr. 13, 2006

Related U.S. Application Data

(60) Provisional application No. 60/626,321, filed on Nov. 8, 2004.

(30) Foreign Application Priority Data

Oct. 13, 2004    (EP)    ................................ 04447226

(51) Int. Cl.
  *C08F 283/00*    (2006.01)
  *C08G 61/02*    (2006.01)
(52) U.S. Cl. .............................. 525/69; 525/64; 525/67; 525/68; 528/330; 528/391
(58) Field of Classification Search ............. 525/67–69, 525/64; 528/390, 391
  See application file for complete search history.

(56) References Cited

U.S. PATENT DOCUMENTS

| 5,817,430 | A | 10/1998 | Hsieh |
| 6,063,637 | A * | 5/2000 | Arnold et al. .................. 436/94 |
| 6,737,279 | B1 * | 5/2004 | Chen .......................... 436/546 |
| 6,759,488 | B1 | 7/2004 | Sellergren et al. |
| 2003/0166306 | A1 | 9/2003 | Sellergren et al. |

FOREIGN PATENT DOCUMENTS

| WO | WO 01-19886 | 3/2001 |
| WO | WO 02/079268 | * 10/2002 |

OTHER PUBLICATIONS

Glad, et al. *Molecularly Imprinted Composite Polymers Based on Trimethylolpropane Trimethacrylate (TRIM) Particles for Efficient Enantiomeric Separations*, Reactive Polymers 25 (1995) pp. 47-54.
Saito, et al. *Synthesis of Solubale Poly(arylenevinylene)s Carrying Various Heterocycles as Arylene Units*, 6019 Macromolecules, 28, Nov. 20, 1995, No. 24 pp. 83638367.
European Search Report for European Application EP 04 44 7226 completed on Mar. 7, 2005.

\* cited by examiner

*Primary Examiner*—Irina S Zemel
(74) *Attorney, Agent, or Firm*—Knobbe Martens Olson & Bear LLP

(57) ABSTRACT

The present invention provides a conjugated polymer with provided thereon at least one molecular imprinted polymer (MIP) and a method for preparing such a polymer. The conjugate polymer provided with at least one MIP according to the invention combines both transducer properties and selectivity properties in one single material. Therefore, it is particularly suitable for use in chemo- or bio-sensors. Furthermore, the conjugate polymer provided with at least one MIP may be used in electronic devices and in chromatography, molecular recognition, selective sample enrichment or in catalysis.

21 Claims, 2 Drawing Sheets

CONJUGATED POLYMERS PROVIDED WITH AT LEAST ONE MOLECULAR IMPRINTED POLYMER AND A METHOD FOR THEIR PREPARATION VIA CONJUGATED MACRO-INIFERTERS

CROSS-REFERENCE TO RELATED APPLICATIONS

This application claims priority under 35 U.S.C. § 119(e) to U.S. Provisional Application No. 60/626,321, filed Nov. 8, 2004. The above-referenced prior application is incorporated by reference herein in its entirety and is hereby made a portion of this specification.

FIELD OF THE INVENTION

The present invention relates to conjugated polymers provided with at least one molecular imprinted polymer (MIP). More particularly, the invention relates to a method for preparing molecularly imprinted conjugated polymers (MICPs) by using conjugated macro-iniferters and to electronic devices comprising such molecularly imprinted conjugated polymers. The invention furthermore relates to a method for preparing a conjugated macro-iniferter.

BACKGROUND OF THE INVENTION

Conjugated polymers are organic macromolecules comprising at least one backbone chain of alternating double- and single-bonds. The opto-electronic properties of conjugated (semi-conducting) polymers have created opportunities for a number of applications such as, for example, light-emitting diodes, light-emitting electrochemical cells, solid-state lasers, solar cells, photodetectors and recently biological and chemical sensors for use in medical diagnostics and toxicology.

It is essential for active layers in chemo- or bio-sensors to combine two functions, i.e., selective molecular recognition and signal transduction. Molecular imprinting polymers (MIP) have unique properties that make them especially suitable for this sensor technology. MIPs exhibit a good specificity to various compounds of medical, environmental, and industrial interest and have excellent operational stability. However, because these arrangements do not fulfill the criterion that a biosensor has a recognition element and transducer in close proximity, they cannot be considered biomimetic sensors in the strict sense.

Bio-electronics is a rapidly progressing interdisciplinary research field at the junction of chemistry, biochemistry, physics, and material science that aims to integrate biomolecules and electronic elements into functional systems. The passage of electrons between biomolecules and electronic elements is the essence of all bio-electronic systems. Nevertheless, electronic units and biomolecules lack natural communication. Different electronic methods have been employed to transduce the biological functions occurring at the electronic supports. These include electrical transduction, such as current, potential changes, piezoelectric transduction, field effect transistors transduction, photo-electrochemical transduction and others.

An important aspect in the design of a MIP-based sensor is to find an appropriate way of interfacing the polymer with the transducer. In most cases, the MIP has to be brought into close contact with the transducer surface. Up to now several approaches were investigated: in situ electro-polymerization on conducting surfaces such as gold; entrapped MIP-particles into gels and behind a membrane for use with electrochemical transducers; spin-coated suspension of MIP particles in solution of inert PVC polymer; and composite particles consisting of an electrically grown conducting polypyrrole into a pre-formed porous MIP.

Up to now grafting of molecularly imprinted polymers or MIPs was reported as grafted coatings on various porous or non-porous surface supports, inorganic materials as oxide or silica particles, on organic materials as resins, i.e., non-conducting materials.

WO 01/19886 provides a material that consists of a support coated with a polymer and a method for forming it. The material is prepared by grafting a polymer layer on the surface of a performed organic or inorganic support material or surface. The grafting can be combined with the technique of molecular imprinting. A molecularly imprinted polymer can be obtained by polymerizing a composition comprising at least one monomer, and a template on a support in a polymerization medium with a free radical initiator, whereafter the template is removed from the resultant polymer. The polymerization is confined on the surface of the support. The support used in the preferred embodiments is preferably selected from the group consisting of porous and non-porous, planar and non-planar inorganic and organic supports. As examples of such support materials can be mentioned oxides such as alumina and silica, and organic resins.

The main drawback of MIPs for use in sensors is the fact that they do not have transducer properties. Hence, they can not convert biological signals into optical or electrical signals, which is a key feature for sensors which are to be used in, for example, molecular diagnostics, and biological or chemical sample analysis.

SUMMARY OF THE INVENTION

It is an object to provide an alternative polymer material with a wider range of properties as well as methods of making the material and devices comprising the material.

The above objective is accomplished by a method and device according to the preferred embodiments.

In one aspect the preferred embodiments provide a single polymer material which combines both transducer properties and selectivity properties, as well as a method for preparing such a material. For example, the preferred embodiments provide a novel polymer molecule or polymer material which is called molecularly imprinted conjugated polymer or MICP. The molecularly imprinted conjugated polymer according to the preferred embodiments has both a transducer functionality and selectivity functionality. The MICP can comprise a conjugated polymer backbone and at least one molecularly imprinted polymer or MIP grafted on the conjugated polymer backbone.

A conjugate polymer need not be fully, i.e. 100%, conjugated because there can always be structural defects which can lead, depending on the synthesis method used, to about 2 to 8%, in most cases between 2 to 5% of the resulting polymer that has not been conjugated. Therefore, in accordance with the preferred embodiments a reference to conjugated polymer includes within its scope a deviation from complete conjugation of about 2 to 5%.

An advantage of the conjugated polymer provided with at least one molecularly imprinted polymer according to the preferred embodiments is that is combines two functions, i.e., selectivity and transducer properties, in one single material. Therefore, the MICP according to the preferred embodiments is particularly suited for use in bio- or chemo-sensors. Furthermore, the conjugated polymer according to the preferred embodiments can be used in other electronic devices, such as for example, organic field effect transistors, bilayer heterojunctions, organic solar cells, hybrid organic solar cells, bulk heterojunctions organic solar cells and all kind of plastic electronic devices. Furthermore, the molecularly imprinted conjugated polymers according to the preferred embodiments can be used in chromatography, in molecular recognition, in selective sample enrichment, or in catalysis.

The molecularly imprinted polymers grafted on the conjugated polymer backbone comprise cavities which can be formed by using template molecules during the formation reaction of the molecularly imprinted conjugated polymers. A cavity can be defined as a free volume within the polymer matrix having a specific shape, size, and functional groups, determined by the kind of template molecule used during the polymerization reaction.

In preferred embodiments, the molecularly imprinted conjugated polymer can be based on poly(p-phenylene vinylene) derivatives, polymers and copolymers, such as, for example, poly(2-methoxy-5-(3',7'-dimethyloctyloxy)-p-phenylene vinylene (OC1C10-PPV, also referred to as MDMO-PPV), on polythiophene derivatives, polymers or copolymer derivatives, such as for example poly-(3-hexylthiophene) (P3HT), or on any other suitable conjugated polymer.

The preferred embodiments furthermore provide a method for the formation of a molecularly imprinted conjugated polymer or, in other words, for the formation of a conjugated polymer provided with at least one molecularly imprinted polymer. The method comprises: forming a partially converted conjugated polymer, which forms a conjugated macro-iniferter polymer, and providing a first molecularly imprinted polymer or MIP onto the conjugated macro-iniferter polymer.

Forming a partially converted conjugated polymer which is a conjugated macro-iniferter can be performed in solution or in thin film and can comprise: reacting a solution of monomers with a basic compound to form a precursor polymer, and partially converting the precursor polymer.

Providing a first molecularly imprinted polymer or MIP onto the conjugated macro-iniferter polymer can comprise: irradiating the conjugated macro-iniferter polymer with UV light, thus forming a conjugated macro-iniferter radical, and reacting the macro-iniferter radical with at least a first and a second monomer in the presence of a template molecule.

In a preferred embodiment, the providing or grafting of a first molecularly imprinted polymer or MIP onto the conjugated macro-iniferter polymer can furthermore comprised removing the template molecule, thereby forming cavities. This can be done by, for example, performing a washing step with an organic or aqueous solvent or with a mixture of at least two solvents.

In a preferred embodiment, the method can furthermore comprise providing a second molecularly imprinted polymer onto the partially converted polymer.

In a further aspect of the preferred embodiments, the molecularly imprinted conjugated polymer according to the preferred embodiments can be used in bio- or chemo-sensors, in electronic devices, such as for example, organic field effect transistors, bilayers heterojunctions organic solar cells, hybrid organic solar cells, bulk heterojunctions organic solar cells and all kind of plastic electronic devices. Furthermore, the molecularly imprinted conjugated polymers according to the preferred embodiments can be used in chromatography, in molecular recognition, in selective sample enrichment, or in catalysis.

Although there has been constant improvement, change, and evolution of devices in this field, the present concepts are believed to represent substantial new and novel improvements, including departures from prior practices, resulting in the provision of more efficient, stable, and reliable devices of this nature.

These and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
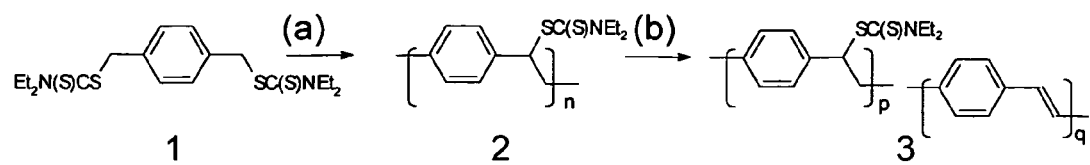
FIG. 1 illustrates a reaction scheme of the dithiocarbamate precursor route according to an embodiment for the synthesis of a partially conjugated polymer used as conjugated macro-iniferter.

In the different figures, the same reference signs refer to the same or analogous elements.

DETAILED DESCRIPTION OF THE PREFERRED EMBODIMENT

The preferred embodiments will be described with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

It is to be noticed that the term "comprising," used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

The preferred embodiments provide a novel material comprising a conjugated polymer as a backbone with provided thereon at least one MIP. In the further description, the novel material according to the preferred embodiments will be referred to as "molecularly imprinted conjugated polymer" or MICP. Molecularly imprinted conjugated polymers (MICPs) are a new concept of molecularly imprinted polymers or MIPs in which the function of transducer is introduced by incorporating a conjugated polymer backbone onto which a MIP can be grafted. Strictly speaking, a conjugate polymer is never fully (for example, 100%) conjugated because there are always structural defects which can lead, depending on the synthesis method used, to about 1 to 5% of chemical defects which may break through the conjugation of the polymer, and hence from about 1 to 5% of the resulting polymer may not be conjugated. Therefore, when, in the further description, is talked about conjugated polymers, it is noted that this deviation of from about 1 to 5% has been taken into account.

The molecularly imprinted conjugated polymer or MICP according to the preferred embodiments combines two functions, i.e., molecular recognition and signal transducer, in one single material. This is contrary to the molecularly imprinted polymers or MIPs which only have a selectivity function. The preferred embodiments furthermore provide a method for the fabrication of such a molecularly imprinted conjugated polymer and the use of this material in, for example, chemo- or bio-sensors, in all kind of electronic devices, in chromatography, in molecular recognition, in selective sample enrichment, and in catalysis as well as the devices made with the material.

Conjugated polymers with macromolecular side chains that are molecularly imprinted polymers will place the transducer (conjugated backbone) very close to the recognition element (molecularly imprinted polymer). Hence, molecularly imprinted conjugated polymers are a new class of materials, exhibiting predetermined selective molecular recognition in combination with electrical conductivity, and fluorescence properties.

The preferred embodiments provide a molecular imprinted conjugated polymer or MICP and a method for preparing such a molecular imprinted conjugated polymer. The molecular imprinted conjugated polymer according to the preferred embodiments is prepared by reacting at least one functional monomer, a cross linking monomer, a template, and a conjugated macro-iniferter polymer under polymerizing conditions, optionally followed by removing the template from the resultant polymer.

In a first reaction step, a monomer comprising an initiator group such as, e.g., a dithiocarbamate group or any other suitable initiator group, is reacted with a basic compound in the presence of an organic solvent (or aqueous solvent or mixture of two solvents) to obtain a precursor polymer, which, in a further step of the reaction, will be converted into the corresponding partially conjugated polymer. In the further description, the method according to the preferred embodiments will be described starting from dithiocarbamate functionalized monomers. However, it has to be understood that this is only by means of an example and is not limiting to the invention.

In a preferred embodiment, the monomer can be a dithiocarbamate functionalized monomer with general formula:

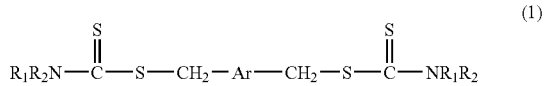

(1)

wherein Ar is an aromatic group or a heteroaromatic group with or without side groups or side chains, with or without extended aromatic systems, with or without electronic charges, with or without cyclic structures, etc., and all copolymers of two or more different monomers. As already described, the preferred embodiments can also be applied in the case of monomers in which the dithiocarbamate group is replaced by any other suitable functional group which may have the function of a radical initiator group.

According to a preferred embodiment, the Ar group can be an aromatic divalent group with any of 4 to 20 carbon atoms which can be substituted with one or more substituents independently selected from the group consisting of $C_1$-$C_{20}$-alkyl, $C_3$-$C_{20}$-alkoxy, or $C_1$-$C_{20}$-alkylsulfate. These groups can comprise up to 4 heteroatoms chosen from the group comprising oxygen, sulfur, and nitrogen in the aromatic divalent group.

In a further embodiment, the aromatic or heteroaromatic divalent group can be selected from the group consisting of 1,4-phenylene; 2,6-naphthalenediyl; 1,4-naphthalenediyl; 1,4-anthracenediyl; 2,6-anthracenediyl; 9,10-anthracenediyl; 2,5-thienylene; 2,5-furnaediyl; 2,5-pyrrolediyl; 1,3,4-oxadiazole-2,5-dyil; 1,3,4-thiadiazole-2,5-diyl; 2,5-benzo[c]thienylene; thieno[3,2-b]thiophene-2,5-diyl; pyrrolo[3,2-b]pyrrole-2,5-diyl; pyrene-2,7-diyl; 4,5,9,10-tetrahydropyrene-2,7-diyl; 4,4'-bi-phenylene; phenantrene-2,7-diyl; 9,10-dihydrophenantrene-2,7-diyl; dibenzofurane-2,7-diyl; dibenzothiophene-2,7-diyl, and fluoranthenediyl. Preferably, Ar is 1,4-phenylene or 2,5-thienylene and most preferably Ar is 2,5-thienylene.

In preferred embodiments, $R_1$ and $R_2$ can be a $C_1$-$C_{20}$-alkyl group. In other embodiments, $R_1$ and $R_2$ can be selected from the group consisting of methyl, ethyl, and isopropyl. $R_1$ and $R_2$ can, in some embodiments, be different from each other, but can however, in other embodiments, also be the same.

The basic compound can be a metal base, an ammonium base or a non-charged based, such as amines, for example, triethylamine, pyridine and non-ionic phosphazene bases. The metal in these basic compounds can preferably be an alkali metal or an alkaline earth metal, i.e., a metal from Group IA or IIA. Classes of metal and ammonium bases include metal hydrides, such as NaH or KH, metal hydroxides, such as NaOH, LiOH or KOH, metal alkoxides, such as NaOMe or NaOEt, KOtBu, metal amides, such as $NaNH_2$, $NaN(SiMe_3)_2$, lithiumdiisopropylamide (LDA), organometallic compounds wherein the metal is an alkali metal or alkaline earth metal, such as, for example, a $C_{1-20}$ alkyl lithium (e.g., n-BuLi) or a $C_{1-20}$ alkyl sodium, Grignard reagents, and ammonium hydroxides. When polar aprotic solvents are used as an organic solvent, it is preferred to use metal hydrides as they show substantially no nucleophilic properties. In polar protic solvents it is preferred to use bases with a pKa larger than the pKa of the solvent. In this case, the solvent is deprotonated and acts as the actual basic compound. In the method of the preferred embodiments, it can be preferred to use an aprotic solvent. A mixture of solvents can also be used. Examples of solvents which can be used include for example amides of the general formula $R_3$—$CONR_4H$, amines of the general formula $R_5R_5$—N—$R_6$, sulfones of the general formula $R_6$—$SO_2$—$R_7$, sulfoxides of the general formula $R_6$—SO—$R_7$, a solvent from the group consisting of alcohols, such as for example sec-butanol and any linear or branched compound of formula $C_nH_{2n+2}O$ where $1 \leq n \leq 20$, glycols, polyethers, cyclic ethers, unsaturated ethers, wherein $R_3$, $R_4$ are the same or different and denote H, a linear or branched alkyl group, or $R_3$ and $R_4$ together are —$(CH_2)_2$—, —$(CH_2)_3$—, $CH_2$—CH=$CH_2$—$CH_2$ or —$(CH_2)_4$—; and $R_5$ has the meaning of $R_3$ or is a phenyl group which is unsubstituted or substituted by halogen, methyl, and/or methoxy groups; and $R_6$ and $R_7$ are the same or different and have the meaning of $R_5$, except H, or $R_6$ and $R_7$ together are —$(CH_2)_2$—, —$(CH_2)_3$—, —$(CH_2)_4$—, or —$CH_2$—CH=CH—$CH_2$—.

In a second reaction step the precursor polymer is converted into the corresponding partially converted conjugated polymer. By 'partially converted' it is meant that in the conjugated polymer, formed by converting the precursor polymer formed after reaction of the starting monomer comprising initiator groups, such as for example dithiocarbamate groups, with a basic compound, not all initiator groups, such as for example dithiocarbamate groups, are eliminated and hence, some still remaining initiator groups, such as for example dithiocarbamate groups, are present in the resulting conjugated polymer, thus called a partially converted conjugated polymer.

The precursor polymer can be converted into the corresponding partially conjugated polymer in two ways, i.e., by thermal heating of the precursor polymer solution under inert atmosphere or in a thin film prepared by spin-coating or drop-casting under vacuum or under inert atmosphere. The remaining initiator groups, such as, in the example given, dithiocarbamate groups, are randomly distributed over the conjugated polymer and their exact position can not be controlled. The percentage of remaining initiator groups, such as, in the example given, dithiocarbamate groups, within the conjugated polymer can be tuned by changing the experimental conditions such as, for example, temperature, conversion time, and atmosphere. The amount of remaining initiator groups, such as, in the example given, dithiocarbamate groups, can, according to the preferred embodiments, preferably be less than about 10%, more preferably less than about 5% and most preferably less than about 1%. For example, if the percentage of the remaining initiator groups is 5%, it means that there are, in the resulting partially converted conjugated polymer, for 100 monomer units 5 monomer units still having an initiator group and 95 monomer units not having an initiator group. The lower the amount of remaining dithiocarbamate groups, the higher the conjugation degree of the conjugated polymer backbone, and hence, the better the transducer properties of the resulting MICP.

In FIG. 1, the reaction mechanism for forming a partially converted conjugated polymer starting from a dithiocarbamate monomer, this reaction mechanism, also called the dithiocarbamate precursor route, and described in European Patent Appl. No. EP 03 447 264 (not yet published), is illustrated. In the example given, a starting dithiocarbamate monomer 1 with general formula (1), wherein the Ar group is a benzene ring and wherein $R_1=R_2=$an ethyl group (Et), is, in a first reaction step (a), reacted with a strong base to form the corresponding precursor polymer 2. In a next reaction step (b), the precursor polymer 2 is converted into the corresponding partially converted conjugated polymer 3, for example, by thermal heating of a precursor polymer solution. As can be seen from FIG. 1, the partially converted conjugated polymer 3 still comprises some remaining dithiocarbamate groups, in the example given $SC(S)NEt_2$, on the conjugated backbone.

After forming the partially converted conjugated polymer, this partially converted conjugated polymer, also called conjugated macro-iniferter polymer, is irradiated with UV for a certain time, for example, for about 70 min, but preferably not longer than 3 hours, in certain embodiments. UV irradiation can, for example, be performed by means of a mercury UV lamp. The wavelength of the UV light is not generally of importance—the full wavelength range of the UV light can be used and can be tuned in accordance with the maximum absorption of the partially converted polymer. Due to the UV irradiation, radicals are formed, i.e., a first radical is formed at the place where a remaining initiator group, such as, e.g., a dithiocarbamate group, was positioned, thus forming a conjugated macro-iniferter radical, and a second radical is an initiator group radical, such as, e.g., a dithiocarbamate radical. From the moment the UV irradiation is stopped, the radicals get back together to form the partially converted conjugated polymer. The method for forming partially converted conjugated polymers via the above described method allows the preparation of conjugated macro-iniferters which can promote controlled radical polymerization under UV irradiation and which can be used for the preparation of molecularly imprinting polymers (MIPs) grafted on semiconducting conjugated polymers.

Other methods for forming radicals can also be used according to the preferred embodiments, such as e.g. radical formation via heating. However, in that case the starting monomers should comprise initiator groups which form radicals by heating. This is not the case when dithiocarbamate groups are used as initiator groups.

The conjugated macro-iniferter radical is then reacted with at least a first functional monomer, for example, a vinylate, acrylate, or methacrylate monomer, and a second functional monomer, for example, a vinylate, arylate or methacrylate monomer, and in the presence of a template molecule. One of these functional monomers can have the function of a cross linking monomer. The template molecule can be an organic or inorganic molecule, antibodies, antigens, amino acids, peptides, proteins, ions, nucleotides or derivatives thereof. This reaction step (d) results in a polymer being grafted onto the conjugated polymer backbone at that position of the conjugated macro-iniferter where the radical was positioned. This results in a molecularly imprinted conjugated polymer comprising a cavity to which the template molecule is still bound. A cavity can be defined as a free volume within the polymer matrix having a specific shape and size, determined by the kind of template used during the polymerization reaction. Preferably, the template molecule can then be removed by performing a washing step using, for example, an organic or an aqueous solvent or a mixture of at least two solvents.

The resulting molecularly imprinted conjugated polymer can have an average molecular weight of from about 40 kD to about 1000 kD, preferably from about 40 kD to about 300 kD. The ratio between the conjugated polymer backbone and the MIP can be about 50/50. The molecular weight of the MICP can be controlled by the degree of polymerization such that the molecules does not become too big, i.e., it does not become higher than about 1000 kD, preferably not higher than about 300 kD. Too high molecular weights may result in molecules wherein the cavity 8 in the MIP is not close enough to the conjugate polymer backbone, which may be a drawback when the MICPs are used in, for example, sensors.

Figure 2:
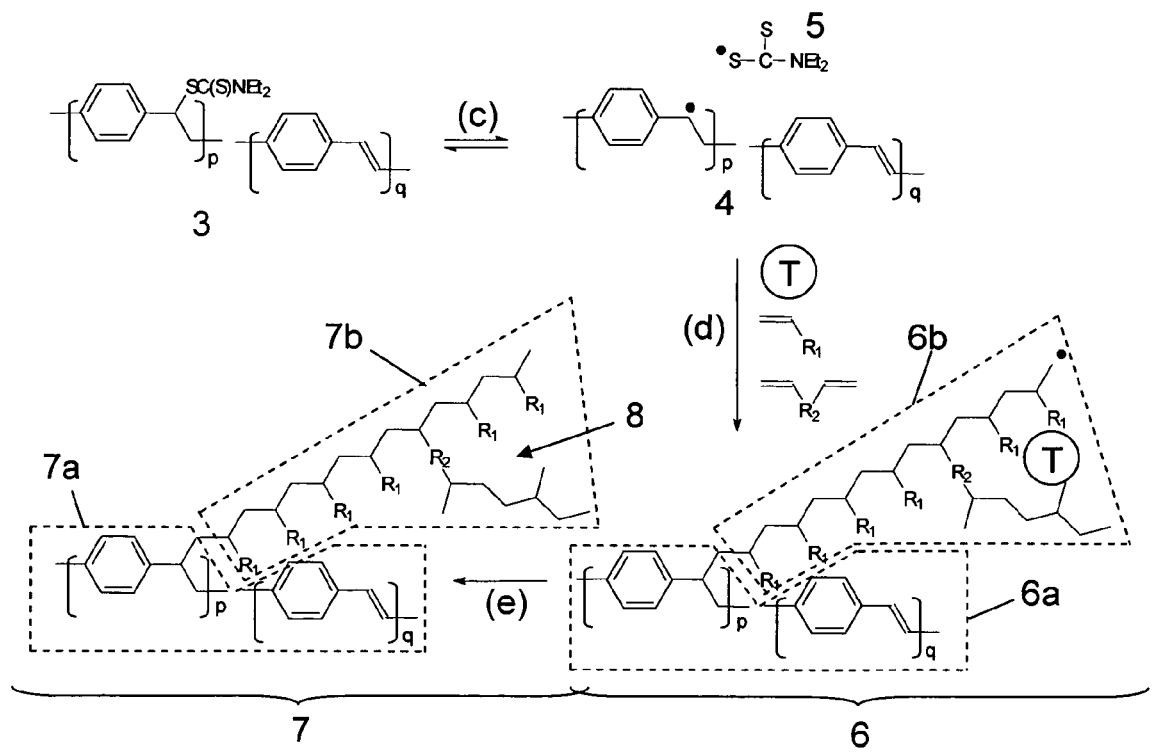
FIG. 2 illustrates the use of a conjugated macro-iniferter for the synthesis of a molecular imprinted conjugated polymer.

The above described reaction mechanism, called free radical polymerization, is illustrated in FIG. 2, starting from the partially converted conjugated polymer 3, based on the dithiocarbamate monomer, as formed in FIG. 1. In reaction step (c), the partially converted conjugated polymer 3, also called a partially conjugated macro-iniferter, with a benzene ring as the aryl group and with $R_1=R_2=Et$, is irradiated with UV light leading to formation of a conjugated macro-iniferter radical 4 and a dithiocarbamate radical 5. Next, (step (d)) the conjugated macro-iniferter radical 4 is reacted with a template molecule T and with, in this specific example, acrylate and vinylate monomers. This leads to a polymer 6, which is a conjugated polymer grafted with a molecularly imprinted polymer or MIP. This polymer 6 still comprises the template molecule T. By washing polymer 6 in a washing step (e), the template molecule T can be removed, hereby forming a molecularly imprinted conjugated polymer 7 comprising a conjugated polymer backbone 7a and grafted thereon a MIP 7b comprising cavities 8. The remaining radicals in polymer 6 will be quenched in the work-up phase. During the washing step (step (e)), if still some remaining radical(s) are present in polymer 6, they will then be quenched.

According to some preferred embodiments, the free radical polymerization reaction as described in steps (d) and (e), can be repeated at least once with a different composition of the solution, i.e., with different monomers and different templates T, in order to obtain a molecular imprinted conjugated co-polymer with at least one further property of selectivity. Hence, a material can be obtained which shows selectivity properties for at least two different molecules and transducer properties.

It has already been described that the conversion step (b) can be performed in solution and in thin film. When, in one embodiment, the conversion step (b) is performed in solution the molecular imprinted conjugated polymer 7 is formed as a bulk material. The conversion in solution is possible when the conjugated polymer is a soluble polymer. The precursor polymer 2 can be subjected to a thermal conversion step at a temperature of, for example, from about 30° C. to about 300° C. The conversion reaction of the precursor polymer 2 starts around 100° C. and can be ended at temperatures of lower than about 250-300° C., depending on the chemical structure of the polymer. At temperatures of about 250-300° C. and higher, the precursor polymer 2 will be completely converted and there will be no remaining dithiocarbamate groups 5 left. In that case, the reaction according to the preferred embodiments for forming a molecularly imprinted conjugated polymer could not be completed.

Figure 3:
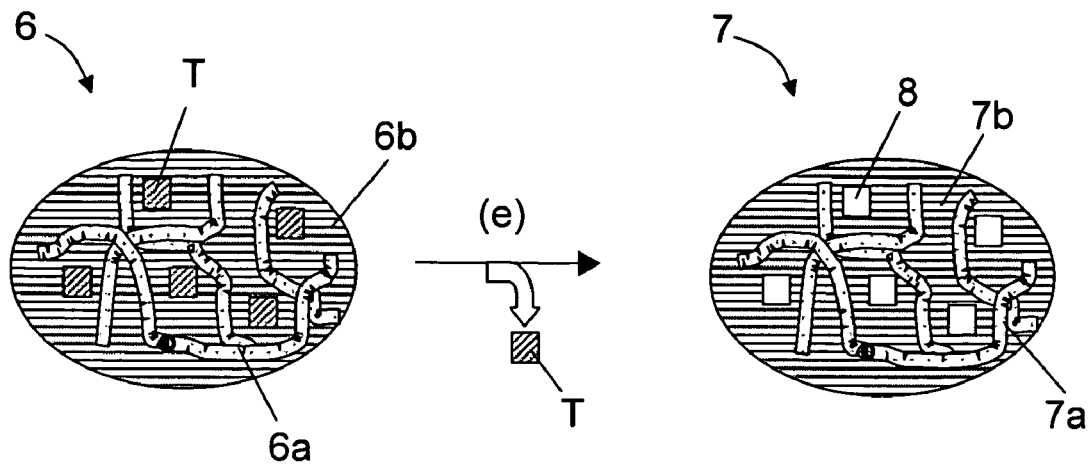
FIG. 3 illustrates a reaction scheme for a molecular imprinted conjugated polymer synthesized as bulk material.

In this embodiment, the precursor polymer 2 can thus be dissolved in a solvent at a given concentration, typically about 0.1 M, and degassed by passing through a continuous nitrogen flow for, for example, about 1 hour. The temperature can then be increased and the inert atmosphere maintained during the conversion reaction and the cooling down. The reaction can then be completed by irradiating the partly converted conjugated polymer 3, also called a macro-iniferter polymer, for initiating a macro-iniferter polymer radical 4 and an initiator group radical 5, which is then reacted with first and second monomers in the presence of template molecules T to form a conjugated polymer 6a grafted with a molecular imprinted polymer or MIP 6b, the MIP still comprising template molecules T. FIG. 3 illustrates the last step of the reaction mechanism, i.e., the washing step (e) for removal of the template molecules T, thereby forming a matrix of molecularly imprinted conjugated polymers 7, comprising a conjugated polymer 7a and grafted thereon a MIP 7b with cavities 8, the size and specific shape of the cavity being determined by the template molecule T used during the polymerization reaction.

Figure 4:
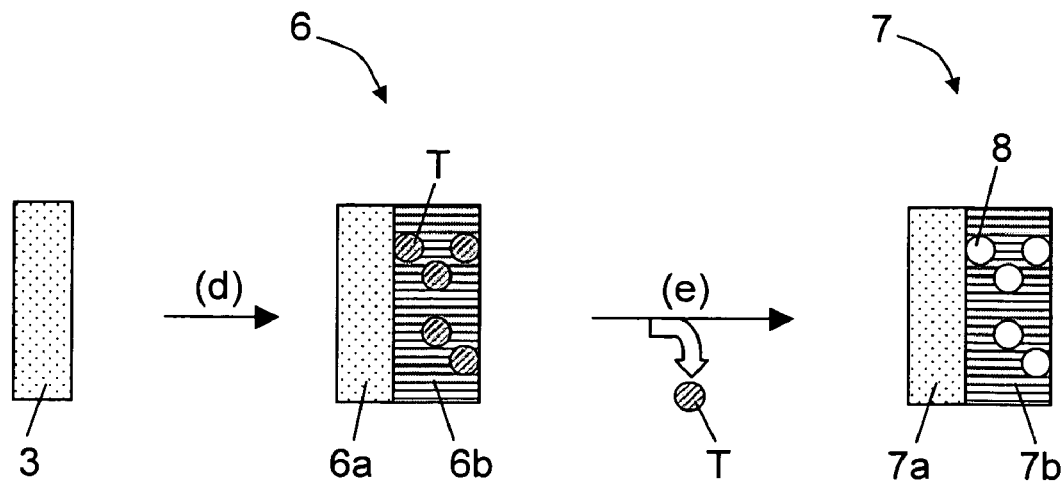
FIG. 4 illustrates a reaction scheme of a molecular imprinted conjugated polymer synthesized using a thin film macro-iniferter polymer.

In another embodiment, the conversion step (b) can be performed in thin film. In such an embodiment, glass substrates coated with indium tin oxide (ITO) are cleaned with isopropanol in an ultrasonic bath for 20 minutes and dried in nitrogen flow. The active layer can then be spin-coated on the glass substrate from a solution of the precursor polymer 2. A two-step process can be used. A first step determines the film thickness and can be done with a closed cover for, for example, 5 seconds at 600 rpm. In a second step, the film can be dried with an open cover for, for example, 2 minutes at 40 rpm. The conversion of the precursor polymer 2 in film can be done in a glove box under inert atmosphere on a hot plate from room temperature to the conversion temperature at 2° C./min followed by less than 10 minutes at the conversion temperature, in order to obtain a partly converted conjugated polymer 3, which then is used as a conjugated macro-iniferter polymer. The conversion reaction can be also carried out under vacuum conditions. After UV radiation, a conjugated macro-iniferter polymer radical 4 in thin film form can be obtained. This is illustrated in FIG. 4. The conjugated macro-iniferter polymer radical 4 is then reacted in reaction step (d) with first and second monomers in the presence of template molecules T. In that way, a conjugated polymer 6a grafted with a MIP 6b is formed, the MIP 6b still comprising the template molecules T.

In this embodiment, the MIP 6b is formed as a thin film on top of the conjugated polymer 6a. After performing a washing step (e), the molecularly imprinted conjugated polymer 7 can be obtained, comprising a thin film MIP 7b with free cavities 8 on top of the conjugated polymer 7a.

The molecularly imprinted conjugated polymer 7 thus obtained comprises two parts, i.e. a conjugated polymer 7a and grafted thereon a MIP 7b, the MIP 7b comprising free cavities 8. These cavities 8 have a specific shape and size and specific functionalities, the shape, size and functionalities being determined by the template molecules T that have been used during formation of the molecularly imprinted conjugated polymer 7.

Because of its structure, the molecularly imprinted conjugated polymer 7 according to the preferred embodiments can be used in chemo- and bio-sensors, because of the fact that it gathers two functions, i.e., the function of molecular recognition and the function of signal transducer, in one single material. Molecular recognition is achieved by the grafted molecular imprinted polymer (MIP macro-side chains), showing high selectivity determined by the cavities 8 and thus by the kind of template molecules T used for the formation of the molecularly imprinted conjugated polymers 7. Signal transducing properties are achieved by the electrical conductivity and fluorescence properties of the conjugated polymer backbone 7b. When using molecularly imprinted conjugated polymers 7 according to the preferred embodiments in sensors, the use of an external transducer for converting biological signals into electrical or optical signals is no longer required. This saves production costs in the manufacturing of chemo- and bio-sensors. Furthermore, if no external transducers have to be added to the sensors, the sensor size can be kept small.

The molecularly imprinted conjugated polymers 7 according to the preferred embodiments can furthermore also be used in other electronic devices, such as for example, but not limited to, organic field effect transistors, bilayer heterojunctions organic solar cells, hybrid organic solar cells, bulk heterojunctions organic solar cells, and all kind of plastic electronic devices. Furthermore, the molecularly imprinted conjugated polymers 7 according to the preferred embodiments can be used in chromatography, in molecular recognition, in selective sample enrichment, or in catalysis.

Hereinafter, some specific examples, according to the method according to the preferred embodiments will be described. These examples are only for illustration and are thus not limiting to the invention.

EXAMPLE 1

Synthesis of a Conjugated Macro-Iniferter Based on Poly(P-Phenylene Vinylene)

A solution of the monomer p-xylene bis(N,N-diethyldithiocarbamate) (500 mg, 1.25 mmol) in dry THF (6.25 ml, 0.2 M) at −78° C. was degassed for 1 hour by passing through a continuous nitrogen flow. An equimolar LDA solution (625 µl of a 2 M solution in THF/n-heptane) was added in one go to the stirred monomer solution. The THF/n-heptane from the basic solution was neglected in the calculation of the monomer concentration. The mixture was then kept at −78° C. for 90 minutes and the passing of nitrogen was continued. After this, ethanol (6 ml) was added at −78° C. to stop the reaction. The polymer was then precipitated in ice water (100 ml) and extracted with chloroform (3×60 ml). The solvent of the combined organic layers was evaporated under reduced pressure and a second precipitation was performed in a 1/1 mixture (100 ml) of diethyl ether and hexane at 0° C. The polymer was collected and dried in vacuum. Then, the polymer (90 mg) was dissolved in a solvent as chlorobenzene (10 ml) and was heated at 125° C. for two hours. After this, the chlorobenzene was evaporated and the polymer was precipitated in methanol at 0° C. The macro-iniferter polymer was collected and dried in vacuum. This allows the manufacturing of a conjugated macro-iniferter polymer. The quantity of remaining dithiocarbamate groups and conjugation can be tuned by experimental conditions, which can be different from what is described here in this specific example.

EXAMPLE 2

Synthesis of a Conjugated Macro-Inifeter Based on OC1C10-PPV

A solution of 2,5-bis(N,N-diethyl dithiocarbamate)-1-(3,7-dimethyl octyloxy)-4-methoxybenzene (250 mg, 0.42662 mmol) in dry THF (2.13 ml, 0.2 M) at room temperature was degassed for 1 hour by passing through a continuous nitrogen flow. An equimolar LDA solution (213 µL of a 2 M solution in THF/n-heptane) was added in one go to the stirred monomer solution. The THF/n-heptane from the basic solution was neglected in the calculation of the monomer concentration. The mixture was then kept at room temperature for 90 minutes and the passing of nitrogen was continued. The polymer was precipitated in ice water (100 ml) and extracted with chloroform (3×60 ml). The solvent of the combined organic layers was evaporated under reduced pressure and a second precipitation was performed in 100 ml of methanol at 0° C. The polymer was collected and dried in vacuum. Yield: 69%, $M_w$ (DMF)=18400, PD=3.3.

The precursor polymer (90 mg) was then dissolved in chlorobenzene (10 ml) and heated at 125° C. for two hours. After this, the chlorobenzene was evaporated and the polymer was precipitated in methanol at 0° C. The polymer was collected and dried in vacuum. Yield: 80%, $M_w$ (DMF)=13300, PD=2.2. This allows the manufacturing of a conjugated macro-iniferter polymer based on the OC1C10-PPV chemical structure. The quantity of remaining dithiocarbamate groups and conjugation are tuned by experimental conditions, which can be different from what is described here in that example.

EXAMPLE 3

Synthesis of a Conjugated Polymer Grafted with Long Organic Side Chains that are also Polymers (not Conjugated)

A conjugated macro-iniferter polymer (10 mg) (for example as prepared in example 1 or 2) was brought into a quartz flask and 2.2 ml of distilled methyl methacrylate (MMA) was added. The solution was degassed by three freeze-pump-thaw cycles. The polymerization was initiated by irradiation with an ultrahigh pressure mercury UV lamp for 70 minutes at room temperature under nitrogen atmosphere. The distance of the lamp to the flask was about 3 cm. After this, the polymer was precipitated in methanol at 0° C., collected and dried in vacuum. This allows the manufacturing of a bulk material that was a conjugated polymer grafted with macro-side chains, which were here in this example PMMA polymer chains. GPC results (THF as solvent, polystyrene standards): $M_w$=152 200, PD=2.2. Other monomers can be used in the same method.

EXAMPLE 4

Synthesis of a Molecularly Imprinted Conjugated Polymer

The conjugated macro-iniferter polymer as, for example, prepared according to example 1 or 2, is brought into a quartz flask, distilled monomer for example methyl methacrylate (MMA), a cross-linker monomer for example Ethylene glycol dimethacrylate (EGDMA) and a template molecule, for example D- or L-phenylalanine anilide is added. The solution is degassed by three freeze-pump-thaw cycles. The polymerization was initiated by irradiation with an ultrahigh pressure mercury UV lamp for a given time at room temperature under nitrogen atmosphere. The distance of the lamp to the flask is about 3 cm. After this, the polymer is precipitated in methanol at 0° C., collected and dried in vacuum. The polymer is then washed with a suitable solvent to eliminate the template molecule. This allows the manufacturing of a bulk material that is a molecularly imprinted conjugated polymer. Other monomers and other template molecules can be chosen.

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A molecularly imprinted conjugated polymer comprising:
   a conjugated polymer backbone; and
   at least one molecularly imprinted polymer grafted on the conjugated polymer backbone, the molecularly imprinted polymer comprising cavities, wherein the cavities have a shape, a size, and functional groups dependent on a template molecule used during a polymerization reaction for forming the molecularly imprinted conjugated polymer, wherein the molecularly imprinted conjugated polymer exhibits predetermined selective molecular recognition in combination with signal transducing properties achieved by electrical conductivity and fluorescence properties of the conjugated polymer backbone.

2. The molecularly imprinted conjugated polymer according to claim 1, having a selectivity functionality and a transducer functionality.

3. The molecularly imprinted conjugated polymer according to claim 1, wherein the molecularly imprinted conjugated polymer is a poly(p-phenylene vinylene) derivative.

4. The molecularly imprinted conjugated polymer according to claim 1, wherein the molecularly imprinted conjugated polymer is an OC1C10-PPV derivative.

5. The molecularly imprinted conjugated polymer according to claim 1, wherein the molecularly imprinted conjugated polymer is a derivative of a conjugated polymer which comprises at least one unit selected from the group consisting of thiophene, fluorene, arylene, heteroarylene, vinylene, and combinations thereof.

6. The molecularly imprinted conjugated polymer according to claim 1, wherein the molecularly imprinted conjugated polymer is a poly-(3-hexylthiophene) derivative.

7. The molecularly imprinted conjugated polymer according to claim 1, wherein the conjugated polymer backbone is derived from a dithiocarbamate functionalized monomer of general formula (1):

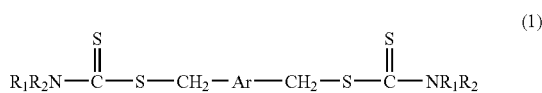
(1)

wherein Ar is an aromatic or heteroaromatic divalent group having from 4 to 20 carbon atoms, wherein Ar is unsubstituted or substituted with one or more substituents independently selected from the group consisting of $C_1$-$C_{20}$-alkyl, $C_3$-$C_{20}$-alkoxy, and $C_1$-$C_{20}$-alkylsulfate, and wherein Ar, when heteroaromatic, comprises up to 4 heteroatoms selected from the group consisting of oxygen, sulfur, and nitrogen in the heteroaromatic divalent group, wherein $R_1$ is a $C_1$-$C_{20}$-alkyl group, and wherein $R_2$ is a $C_1$-$C_{20}$-alkyl group.

8. The molecularly imprinted conjugated polymer according to claim 7, wherein $R_1$ and $R_2$ are independently selected from the group consisting of methyl, ethyl, and isopropyl.

9. The molecularly imprinted conjugated polymer according to claim 7, wherein Ar is selected from the group consisting of 2,6-naphthalenediyl; 1,4-naphthalenediyl; 1,4-anthracenediyl; 2,6-anthracenediyl; and 9,10-anthracenediyl.

10. The molecularly imprinted conjugated polymer according to claim 7, wherein Ar is 1,4-phenylene.

11. The molecularly imprinted conjugated polymer according to claim 7, wherein Ar is 2,5-thienylene.

12. The molecularly imprinted conjugated polymer according to claim 1, having an average molecular weight of not higher than about 1000 kD.

13. The molecularly imprinted conjugated polymer according to claim 1, having an average molecular weight of from about 40 kD to about 1000 kD.

14. The molecularly imprinted conjugated polymer according to claim 1, having an average molecular weight of not higher than about 300 kD.

15. The molecularly imprinted conjugated polymer according to claim 1, having an average molecular weight of from about 40 kD to about 300 kD.

16. The molecularly imprinted conjugated polymer according to claim 1, wherein a ratio between the conjugated polymer backbone and the molecularly imprinted polymer is about 50/50.

17. The molecularly imprinted conjugated polymer according to claim 1, wherein an amount of initiator groups remaining in the molecularly imprinted conjugated polymer is less than about 10%.

18. The molecularly imprinted conjugated polymer according to claim 1, wherein an amount of initiator groups remaining in the molecularly imprinted conjugated polymer is less than about 5%.

19. The molecularly imprinted conjugated polymer according to claim 1, wherein an amount of initiator groups remaining in the molecularly imprinted conjugated polymer is less than about 1%.

20. The molecularly imprinted conjugated polymer according to claim 1, wherein the conjugated polymer backbone is of general formula:

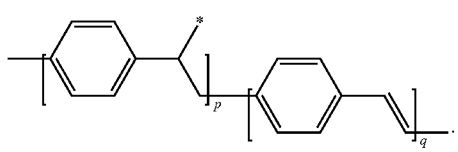

21. The molecularly imprinted conjugated polymer according to claim 1, of general formula:

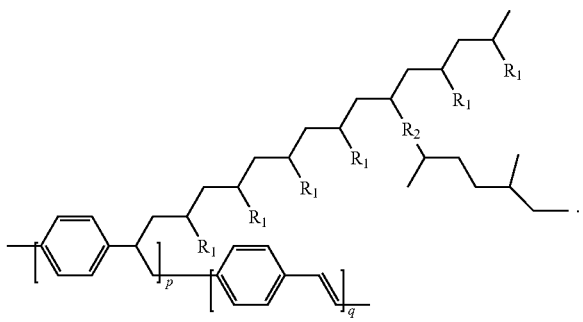

* * * * *

UNITED STATES PATENT AND TRADEMARK OFFICE
CERTIFICATE OF CORRECTION

PATENT NO. : 7,649,048 B2  Page 1 of 1
APPLICATION NO. : 11/247397
DATED : January 19, 2010
INVENTOR(S) : Lutsen et al.

It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 978 days.

| Issued Patent | | 1. Description of Discrepancy |
|---|---|---|
| Column | Line | |
| Page 1 (Item 56) Col. 2 | 15 | Under Other Publications, change "Solubale" to --Soluble--. |
| 3 | 39 | Change "comprised" to --comprise--. |
| 3 | 51 | Change "bilayers" to --bilayer--. |
| 6 | 9 | Change "furnaediyl;" to --furanediyl;--. |
| 6 | 24 | Change "based," to --base,--. |
| 11 | 16 | Change "Inifeter" to --Iniferter--. |

Signed and Sealed this

Twentieth Day of July, 2010

David J. Kappos
*Director of the United States Patent and Trademark Office*